INVENTOR:
Gerald L. Brewer

ATTORNEYS

United States Patent Office 3,706,533
Patented Dec. 19, 1972

3,706,533
THERMAL INCINERATION UNIT
Gerald L. Brewer, Norwalk, Conn., assignor to Universal Oil Products Company, Des Plaines, Ill.
Filed Dec. 28, 1970, Ser. No. 102,056
Int. Cl. F23g 7/06; F23j 5/06
U.S. Cl. 23—277 C                  4 Claims

ABSTRACT OF THE DISCLOSURE

A fume incinerating unit having a multiple section, tubular-form combustion chamber, where the sections are connected in a serpentine manner and positioned within a fume receiving housing in a manner whereby the fumes will pass over and around the plurality of sections in a heat exchange relationship therewith. The unit is particularly adapted for use with wire enameling-drying ovens where the fumes from the plurality of coated wires can pass laterally into the housing for the incinerator unit and transversely across the plurality of tubular sections comprising the combustion chamber.

---

Figure 1:
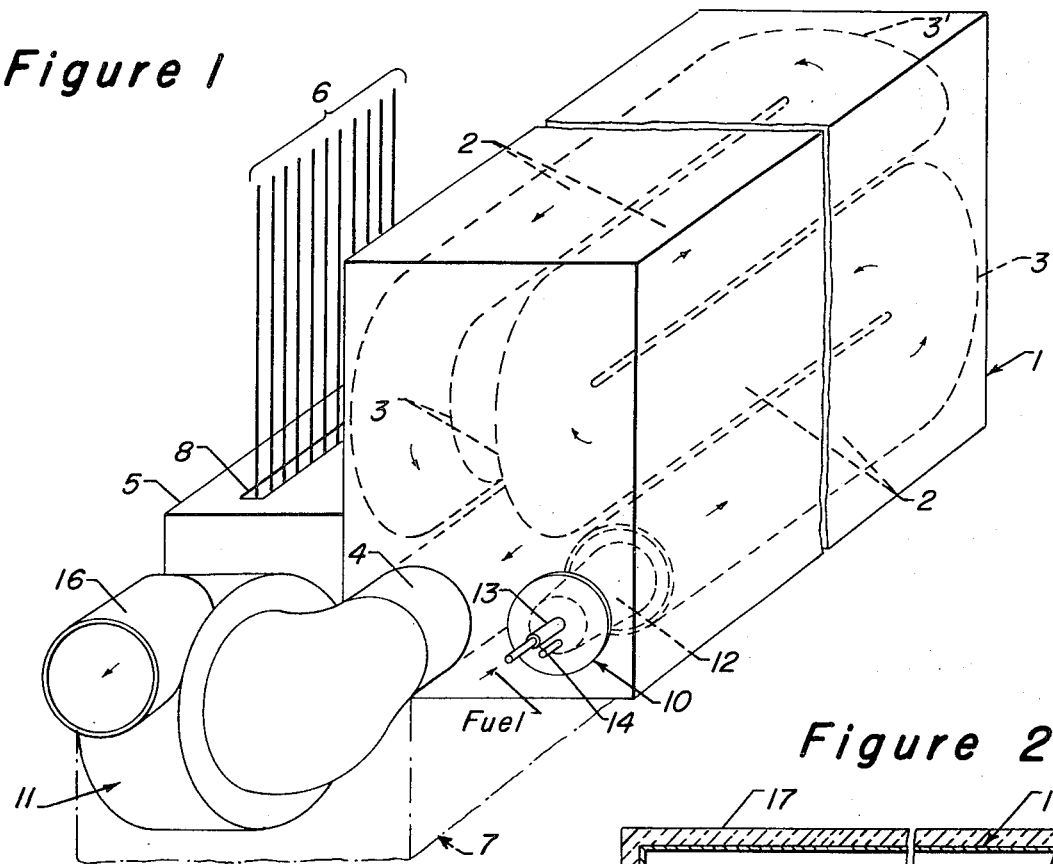

The present invention relates to an advantageous form of incineration unit for effecting the thermal conversion of noxious fumes. More particularly, the invention is directed to a multiple section, or multiple pass, tubular-form combustion chamber which has the sections connected in a serpentine manner and positioned in heat exchange relationship with the incoming fume containing stream.

It is realized that there have been various types and forms of waste gas incineration devices and systems, as for example, typical and unsophisticated installations have utilized one or more burners in a waste gas stack to provide for the emission of flame and hot combustion gases in an amount sufficient to thermally convert the combustible and noxious components of the stream. In more complex and expensive incinerator units there have been various flow arrangements or heat exchange devices in combination with a combustion chamber, or with the hot exhaust gas stream from the combustion zone. Certain units have actually utilized two or more co-current and/or countercurrent heat exchange flow paths in an endeavor to conserve heat and provide a high thermal efficiency to the system.

In all systems it is, of course, recognized that in order to obtain high incineration efficiency, there must be the three customary elements of combustion; i.e., time, temperature and turbulence. For complete combustion, oxygen must be brought into contact with the combustible molecules of the waste gas stream at a sufficient temperature and for a sufficient length of time to permit the oxidation reaction to be completed. Where there is incomplete combustion, there can be the generation of aldehydes, organic acids, carbon, carbon-monoxide, nitrogen oxides and other undesirable components. Many drying ovens have, in the past, used catalytic incinerator means; however, it appears that newer types of wire and metal coatings have greater amounts of solids losses which can contaminate a catalyst and more quickly render it inactive.

It is thus a principal object of the present invention to provide an incinerator unit where efficient thermal oxidation can take place for the combustible fumes in a waste gas stream.

It is also an object of the invention to provide an elongated serpentine form of combustion chamber which can be in heat exchange relationship with the incoming waste gas stream and also provide adequate contact time for complete combustion of fumes.

A still further object of the invention is to provide the burner positioning and the waste gas inlet means to the combustion zone in a manner to utilize a nozzle or fuel mixing arrangement whereby all burner air is supplied by the waste stream and there is elimination of the additional air supply to the burner for premixing with the fuel supply. There is also the elimination of an air blower for the burner air and the usual starter and control means for the air to the burner.

In a broad aspect, the invention provides a thermal fume incinerator unit which comprises in combination, housing means, a fume-air inlet means into said housing means, a multiple section, tubular-form combustion chamber positioned in said housing, with the sections of said chamber connected in a serpentine manner and spaced apart from one another to thereby permit incoming air and fumes to pass therearound in heat exchange relationship, a burner-flame inlet means and a fume inlet passageway from the interior of said housing means connective to one end of said tubular combustion chamber, and a treated gas outlet means from the opposing end of said combustion chamber and from said housing means.

It is not intended to limit the tubular form combustion chamber to any one type of construction. For example, such chamber may be of circular enlongated sections interconnected with U-bends or, alternatively, a particular housing may be partitioned in a manner to provide a serpentine flow path for the hot combustion gases throughout the elongated length of the combustion chamber. The diameter, or cross-sectional area, for the tubular-form combustion chamber will vary in accordance with the volume of fumes and waste gases to be processed through the incineration unit and as a result will generally have a relatively large cross-sectional area. However, even for relatively small incineration systems, it is necessary that the tubes for the combustion chamber be sufficiently large in diameter as to provide turbulent flow and preclude laminar flow.

A preferred construction and design for the incinerator unit also provides a baffled flow arrangement for the incoming fume laden waste gas stream such that the stream will pass substantially uniformly over and around the plurality of tubular sections making up the elongated combustion chamber. The incinerator unit is particularly adapted to having an elongated side inlet for the waste gas stream; however, the stream inlet may be at a top, side or end location and need not be limited to any one position, as long as there is suitable baffle means provided to effect the desired channeling of the incoming gas stream in a heat exchange relationship around the multiple section combustion chamber. The heat exchange relationship, of course, provides fuel economy for the unit by preheating the incoming waste gas stream prior to its introduction into the tubular-form combustion chamber and, at the same time, provides a cooling of the hot combustion gases prior to their discharge from the incineration unit.

It should also be noted that the present form of elongated incinerating unit can be positioned within, or along side of, a drying oven unit such that heat radiating from the tubular wall portions of the incinerator section can be utilized directly in such oven unit. Optionally, recirculating fan means can be used to blow heat from around the incinerator tubular sections into the drying oven to, in turn, provide at least a part of the heat supply drying wire or other "work piece" passing through the oven.

As a stil further desired feature of the present tubular form incineration unit, there may be utilized burner means which will be supplied with fuel only and combustion air for sustaining oxidation of the fuel will be provided by the incoming waste gas stream which will be channeled toward and around the burner nozzle at an inlet zone to the combustion chamber. In other words, there will be 100% secondary air to the burner means and a mixing of the waste gas stream with the fuel at the burner nozzle to provide resulting flame and hot combustion gases. The waste gas stream will then flow co-currently with the burner flame into the inlet of the tubular-form combustion chamber and thence through the length of said chamber. The use of 100% secondary air burner means in combination with a thermal incinerator has been heretofore disclosed in U.S. Pat. No. 3,484,189.

In view of the use of an elongated form of combustion chamber, it will generally be necessary that a hot gas exhaust fan be provided at the outlet zone from the tubular-form combustion chamber, or at least in combination with an outlet plenum or a stack receiving the incinerated gas stream, so as to insure the desired regulated flow of hot gases through the entire length of the tubular form combustion chamber.

Reference to the accompanying drawing and the following description thereof will serve to illustrate the design and arrangement of one embodiment of the present improved form of thermal incinerator as well as point out additional variations and advantages which may be obtained from the use of such special design and arrangement.

FIG. 1 of the drawing is a diagramamtic isometric type view, indicating the use of the special form of thermal incinerator in combination with a vertical oven for heating and drying resin or enamel coatings on wire.

Figure 2:
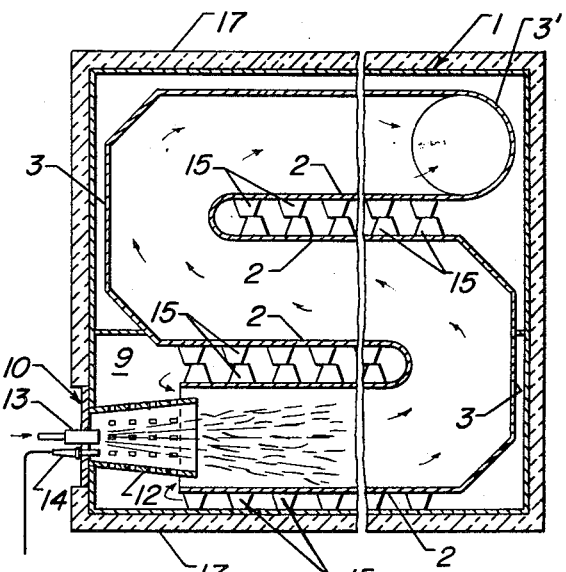

FIG. 2 of the drawing indicates diagrammatically, in a sectional elevational view, the use of a 100% secondary air burner means at the inlet to the elongated tubular-form combustion chamber.

Figure 3:
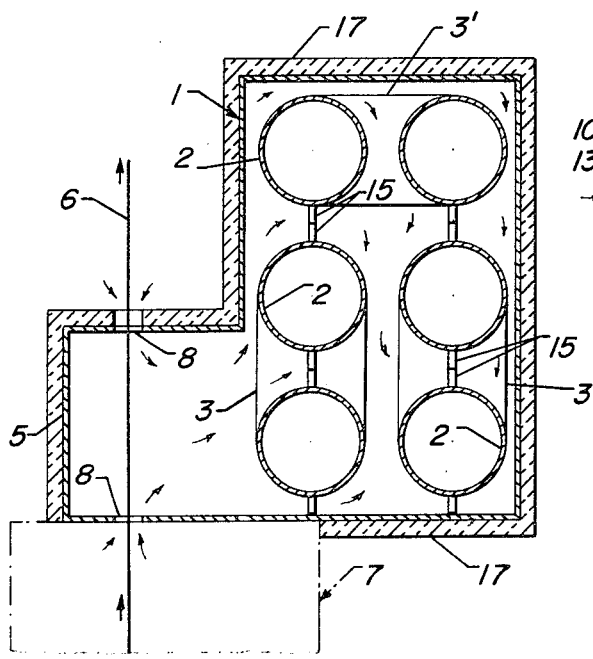

FIG. 3 of the drawing indicates, in a cross-sectional elevational view, the arrangement of a plurality of tubular sections comprising the combustion chamber and, in addition, indicates a baffled heat exchange flow of the incoming waste gas stream around the multiple section combustion chamber.

With particular reference to FIG. 1 of the drawing, there is indicated an elongated housing 1 adapted to hold a plurality of tubular form sections 2 which in turn are interconnected by U-bend sections 3, so as to effect a continuous serpentine flow path throughout the length of all sections 2 and, in turn, form an elongated combustion chamber. In the particular embodiment shown, there is a flow upwardly through one vertical row of tube sections 2 until the gas flow reaches the uppermost tubular section, then there is a lateral U-bend member 3' which carries the combustion gases into a second vertical row of combustion sections 2, whereby the gas flow then passes downwardly to an exhaust gas outlet 4.

As best shown by FIGS. 1 and 3, there is indicated an extended section 5 along one side of housing 1 so as to accommodate the vertical movement of the plurality of wires 6, indicated as moving upwardly from a lower drying oven area 7. Thus, there is a slot arrangement 8 along the upper and lower wall portions of housing extension 5 whereby the plurality of wires 6 may pass therethrough. At the same time, the slotted areas 8 will provide for the intake of fumes and air from the drying oven zone into the housing 1 for the thermal incineration operation. The waste gas stream into the interior of housing 1 will, of course, be solvent and coating vapors, as well as noxious fumes that are odorous in character, from the resins or enamel coatings being applied to the wires passing through the drying oven 7. In order that the fumes from the slot means 8 will carry with sufficient velocity to the combustion chamber and to the inlet zone 9, which in turn surrounds a burner means 10, there is provided a fan means 11 in connection with the exhaust gas outlet 4 so as to insure the pulling of all of the waste gases into and through the multiple section combustion chamber.

As best illustrated in FIG. 2, the one end of the lower tubular section 2 is shortened, or spaced from the end of housing 1, to provide for the positioning of burner means 10 in axial alignment with tube member 2 as well as provide a gas and fume inlet section 9 around the nozzle portion of burner means 10. There is also indicated a stream distributing baffle means 12 such that there is intermixing of air in the waste gas stream with the fuel from the nozzle means 13 of burner 10. It is not intended to limit the fuel-air mixing means to any one type of system or apparatus arrangement and the diagrammatic indication of the perforate cone section 12 is merely one embodiment or method for effecting the desired mixing of fuel and air for introduction into the end of the tubular-form combustion chamber. As a means for ignition, there is a spark plug 14 positioned adjacent the outlet end of the fuel nozzle means 13 of the burner means 10. Such spark plug or ignition means would be used only for igniting the fuel and air at the time of an initial start-up of the thermal incinerator unit.

FIG. 2 also indicates diagrammatically the manner in which tubular members 2, together with end sections 4, will provide a serpentine arrangement for hot gas flow through an elongated tubular form combustion chamber. Preferably, where separate tubular sections 2 are utilized to form the multiple section combustion chamber, there will be a floating type of support or positioning or such sections in the housing 1 such that each section 2 is free to expand radially as well as longitudinally to permit adaption to high temperature expansion conditions. Thus, there is indicated the use of a plurality of spacer means 15 between tubular sections 2 that will have smooth contacting surfaces between one another so as to permit slideability and opposing movements between adjacent sections. The spacer means 15 may also be used to provide baffling or flow control partitioning between rows of tubular sections. For example, as best shown in FIG. 3, the spacer means 15 between stacked sections 2 in the first row of tubular sections adjacent the slot means 8 may be used to provide a substantial blocking of air and waste gas flow so as to cause such waste gas stream to pass up and around the uppermost tubular section 2 and thence downwardly around the adjacent vertical row of tubular sections 2. The waste gas stream is eventually directed into the inlet zone 9 at the zone of the burner means 10 and thence into the open end portion of the lowermost section 2 providing the inlet to the elongated tubular-form combustion chamber. Although not shown, additional baffling may be provided vertically or horizontally between tubular sections 2 in order to channel the waste gas stream flow in any desired path or pattern of flow to result in a desired heat exchange flow pattern with respect to the hot gases passing serially through the multiple section tubular-form combustion chamber.

As best shown in FIG. 1, the present embodiment of the thermal incinerator will have the burner means 10 and the fume inlet passageway into the combustion chamber effected by way of an open-ended lowermost tubular section 2 and the eventual discharge of the treated waste gas stream carried out from the housing 1 by way of the other lowermost tubular section 2. The latter connecting through outlet port 4 to the exhaust fan means 11 such that there is eventual discharge by way of blower outlet means 16 which can connect to a stack or to recirculation means not shown in the drawing. A recirculation arrangement can be used to carry at least a portion of the high temperature treated exhaust gas stream to the drying oven 7 or to another processing zone.

While the embodiment illustrated in the present drawing provides for a separate tubular-form combustion chamber to be supported within the housing 1, it is to be pointed out that suitable built-in partitioning within housing 1 could well provide for the multiple section serpentine flow path through the housing and in effect provide a resulting tubular-form combustion chamber. Still further, it is to be noted that the combustion chamber need not necessarily be of a circular cross-section inasmuch rectangular, hexagonal or other polygonal form of passageway, in turn, being formed by partitioning or by separate tubular sections, could well comprise the confines for the tubular-form combustion chamber. In any event, it is desired that the incoming waste gas stream shall flow between and around the plurality of sections comprising the combustion chamber so as to provide the desired heat exchange relationship with respect to the incoming gas stream and the hot combustion gas product stream.

The 100% secondary air burner means is of advantage in eliminating the need to heat burner air and thus results in a higher thermal efficiency for the overall system; however, a suitable "premix" type burner unit could well be used in combination with the inlet to the tubular-form combustion chamber.

Insulation means 17 has also been shown with respect to FIGS. 2 and 3 of the drawing, inasmuch as typically a suitable insulation should be provided around housing 1 in order to conserve heat within this system. It is, however, not intended to limit the present invention to any one type of insulation or to any one shape for the housing 1. As noted briefly hereinbefore, the present thermal incinerator has been indicated for use in combination with a wire enameling oven and has means for initially pulling the waste gas stream laterally therethrough along the full length of the incinerator unit; but, in connection with other housing configurations, or with different types of waste gas streams, there may be a gas inlet means to such housing at another side location or at one end of the unit.

Also, FIGS. 1 and 3 are merely diagrammatic in their indication of showing the incinerator unit at the top of the oven unit 7 since it could be along side of the drying oven area to permit ease in supplying radiant or convected heat directly into the oven zone. Thus, it is not intended to limit the housing to that shown, nor limit its positioning to any one location in combination with an oven unit. Heat radiating fins can also be provided on the sides of the tubular-form combustion chamber to assist in the heat transfer aspects.

I claim as my invention:

1. A thermal fume incinerator unit which comprises in combination, housing means, a fume-air inlet means into said housing means, a multiple section, tubular-form combustion chamber positioned in said housing means, with the multiple sections of said chamber connected in a serpentine manner and spaced apart from one another to thereby permit incoming air and fumes to pass therearound in heat exchange relationship, said fume-air inlet means to said housing means extending longitudinally along one side portion thereof and baffle means between sections of the tubular-form combustion chamber providing a channeling of the inlet gas stream around such multiple sections of the combustion chamber in a heat exchange relationship therewith, a burner-flame inlet means and a fume inlet passageway from the interior of said housing means connected to one end of said tubular combustion chamber, said tubular-form combustion chamber being in interconnection with at least a portion of a drying oven unit whereby heat may be radiated directly into the latter, said multiple sections of said tubular form combustion chamber being supported in said housing means in a slidable and floatable manner with respect to one another and with respect to said housing means whereby adjacent sections of the combustion chamber may move relative to one another to accommodate the longitudinal and radial temperature movements that can take place with respect to each individual section, and a treated gas outlet means from the opposing end of said combustion chamber and from said housing means.

2. A thermal fume incinerator unit which comprises in combination, housing means, a fume-air inlet means into said housing means, a multiple section, tubular-form combustion chamber positioned in said housing means, with the multiple sections of said chamber connected in a serpentine manner and spaced apart from one another to thereby permit incoming air and fumes to pass therearound in heat exchange relationship, said fume-air inlet means to said housing means extending longitudinally along one side portion thereof and baffle means between sections of the tubular-form combustion chamber providing a channeling of the inlet gas stream around such multiple sections of the combustion chamber in a heat exchange relationship therewith, a burner-flame inlet means and a fume inlet passageway from the interior of said housing means connective to one end of said tubular combustion chamber, said multiple sections of said tubular form combustion chamber being supported in said housing means in a slidable and floatable manner with respect to one another and with respect to said housing means whereby adjacent sections of the combustion chamber may move relative to one another to accommodate the longitudinal and radial temperature movements that can take place with respect to each individual section, and a treated gas outlet means from the opposing end of said combustion chamber and from said housing means.

3. The thermal incinerator unit of claim 2 further characterized in that said burner-flame inlet means comprises a 100% secondary air type burner and fuel-air mixing means in combination with the fuel distributor portion thereof whereby air and fuel may be mixed for producing flame and hot combustion gases to be passed into said tubular-form combustion chamber.

4. The thermal incinerator unit of claim 2 further characterized in that the tubular-form combustion chamber has sufficient cross-section areas to accommodate the burner combustion gases and the fume-air inlet stream to the unit and provide a non-laminar, turbulent type flow throughout the length of the combustion chamber.

References Cited

UNITED STATES PATENTS 3,484,189  12/1969  Hardison et al. ___ 23—277 C X
2,658,742  11/1953  Suter et al. _____ 110—8 A X
3,353,919  11/1967  Stockman _____ 23—277 C JAMES H. TAYMAN, JR., Primary Examiner U.S. Cl. X.R.

23—288 F; 110—8 A; 34—86; 165—81